US008583664B2

(12) United States Patent
Weir et al.

(10) Patent No.: US 8,583,664 B2
(45) Date of Patent: Nov. 12, 2013

(54) EXPOSING METADATA RELATIONSHIPS THROUGH FILTER INTERPLAY

(75) Inventors: Jeffrey Weir, Seattle, WA (US); Alex Weinstein, Seattle, WA (US); Charles Cummins, Seattle, WA (US); Alex Ingerman, Seattle, WA (US); Timothy R. Sullivan, Redmond, WA (US); Katie Jane Messerly, Bothell, WA (US); Daniel Tomko, Bellevue, WA (US); Andrew B. Rothbart, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/788,187

(22) Filed: May 26, 2010

(65) Prior Publication Data

US 2011/0295863 A1    Dec. 1, 2011

(51) Int. Cl.
*G06F 17/30*    (2006.01)

(52) U.S. Cl.
USPC ......................................................... 707/752

(58) Field of Classification Search
USPC ......................................................... 707/752
See application file for complete search history.

(56) References Cited

U.S. PATENT DOCUMENTS

| 8,108,439 | B2 * | 1/2012 | Guo et al. ...................... 707/802 |
| 2007/0203902 | A1 * | 8/2007 | Bauerle et al. ..................... 707/5 |
| 2007/0233654 | A1 | 10/2007 | Karlson et al. |
| 2008/0163328 | A1 | 7/2008 | Philbin et al. |
| 2009/0119262 | A1 | 5/2009 | Guo et al. |
| 2009/0222412 | A1 | 9/2009 | Lee et al. |
| 2010/0077001 | A1 | 3/2010 | Vogel et al. |
| 2010/0088324 | A1 | 4/2010 | Seager et al. |

OTHER PUBLICATIONS

Lee, et al., "FacetLens: Exposing Trends and Relationships to Support Sensemaking within Faceted Datasets", Retrieved at << http://research.microsoft.com/en-us/um/redmond/groups/cue/publications/chi2009-facetlens.pdf >>, Conference on Human Factors in Computing Systems, Proceedings of the 27th international conference on Human factors in computing systems, Apr. 4-9, 2009, pp. 10.
Weiland, et al., "Facet Folders—Flexible Filter Hierarchies with Faceted Metadata", Retrieved at << http://advancingusability.files.wordpress.com/2008/04/1413-weiland.pdf >>, Conference on Human Factors in Computing Systems, CHI '08 extended abstracts on Human factors in computing systems, Apr. 5-10, 2008, pp. 6.

(Continued)

*Primary Examiner* — Hung Q Pham
(74) *Attorney, Agent, or Firm* — Alleman Hall McCoy Russell & Tuttle LLP

(57) ABSTRACT

Embodiments are disclosed that relate to exposing metadata relationships through filter interplay. One embodiment provides a method comprising filtering a collection of items according to a first and a second metadata category to form an original subset of items that comprise metadata values for each of the categories. The method further comprises displaying a first and a second interactive filter view illustrating the original subset arranged according to their respective metadata values. The method further comprises receiving user input modifying an original range of metadata values of the first metadata category to form a modified range, determining a modified subset of items that comprise metadata values of the first metadata category falling within the modified range and that also comprise metadata values of the second metadata category, and modifying the second interactive filter view to illustrate the modified subset.

20 Claims, 5 Drawing Sheets

(56) References Cited

OTHER PUBLICATIONS

"Salmon Run: Faceted Searching with Lucene", Retrieved at << http://sujitpal.blogspot.com/2007/01/faceted-searching-with-lucene.html , Jan. 20, 2007, pp. 17.

Stoica, et al., "Automating Creation of Hierarchical Faceted Metadata Structures", Retirved at << http://flamenco.berkeley.edu/papers/castanet.pdf >>, In Human Language Technologies: The Annual Conference of the North American Chapter of the Association for Computational Linguistics (NAACL-HLT 2007), 2007, pp. 8.

Yee, et al., "Faceted Metadata for Image Search and Browsing", Retrieved at << http://citeseerx.ist.psu.edu/viewdoc/download?doi=10.1.1.8.9649&rep=rep1&type=pdf >>, Conference on Human Factors in Computing Systems, Proceedings of the SIGCHI conference on Human factors in computing systems, Apr. 5-10, 2003, pp. 8.

* cited by examiner

EXPOSING METADATA RELATIONSHIPS THROUGH FILTER INTERPLAY

BACKGROUND

Sorting through large collections of data, such as catalogs of images, music data, video data, etc., can be tedious and time-consuming, as such large collections of data may be difficult to organize and analyze. Various filtering tools may allow a user to more easily locate and view subsets of data of interest within a collection. However, if a subset of data obtained through a filtered search is larger than a user would like, and/or comprises data with a relatively large range of search parameter values, it may be difficult for a user to narrow down the set to a subset of interest. As a result, attempting to understand and form conclusions from the subset of data may pose challenges.

SUMMARY

Various embodiments are disclosed herein that relate to exposing metadata relationships through filter interplay. For example, one disclosed embodiment provides, in a computing device, a method of filtering a collection of items, where each item has metadata including values for one or more of a plurality of metadata categories. The method comprises filtering the collection of items according to a first metadata category and a second metadata category to form an original subset of items that comprise metadata values of the first metadata category and metadata values of the second metadata category. The method further comprises displaying a first interactive filter view illustrating the original subset arranged according to metadata values of the first metadata category and displaying a second interactive filter view illustrating the original subset arranged according to metadata values of the second metadata category. The method further comprises receiving user input via the first interactive filter view modifying an original range of metadata values of the first metadata category to form a modified range of metadata values of the first metadata category, determining a modified subset of items that comprise metadata values of the first metadata category falling within the modified range and that also comprise metadata values of the second metadata category, and modifying the second interactive filter view to illustrate the modified subset arranged according to metadata values of the second metadata category.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, difficulties may be encountered in viewing and filtering large collections of data in a manner that allows a user to easily draw conclusions from the data or see patterns within the data. For example, in a collection of baseball league information, it may be difficult for a user to filter the collection to a desired arbitrary range of a specific category (e.g., On-Base Percentage), to change the desired arbitrary range of a specific category (e.g., OBP>0.333), and/or to easily understand the distribution of items within the specific category (e.g., there are many players with an OBP~0.4 and few players with an OBP~0.6). As another example, in a collection of world leaders, it may be difficult to understand the age distribution of world leaders (e.g., that the ages are in a normal distribution). It may also be difficult to further explore the data and discover underlying relationships and correlations between metadata categories (e.g., how compensation is related to OBP).

Accordingly, various embodiments are disclosed herein that relate to the filtering and presentation of data in a collection such that relationships between metadata categories of items of the collection can be exposed. The disclosed user interface comprises interactive filter views which allow items of the collection to be filtered by their metadata values corresponding to metadata categories associated with the filter views. In response to user input changing a range of metadata values, the subset of items filtered from the collection re-filters to form a modified subset based on the range. Further, the interactive filter views may update to illustrate characteristics of the modified subset. In some embodiments, filter views other than the one receiving user input are updated, while in other embodiments, all filter views may update.

Figure 1:
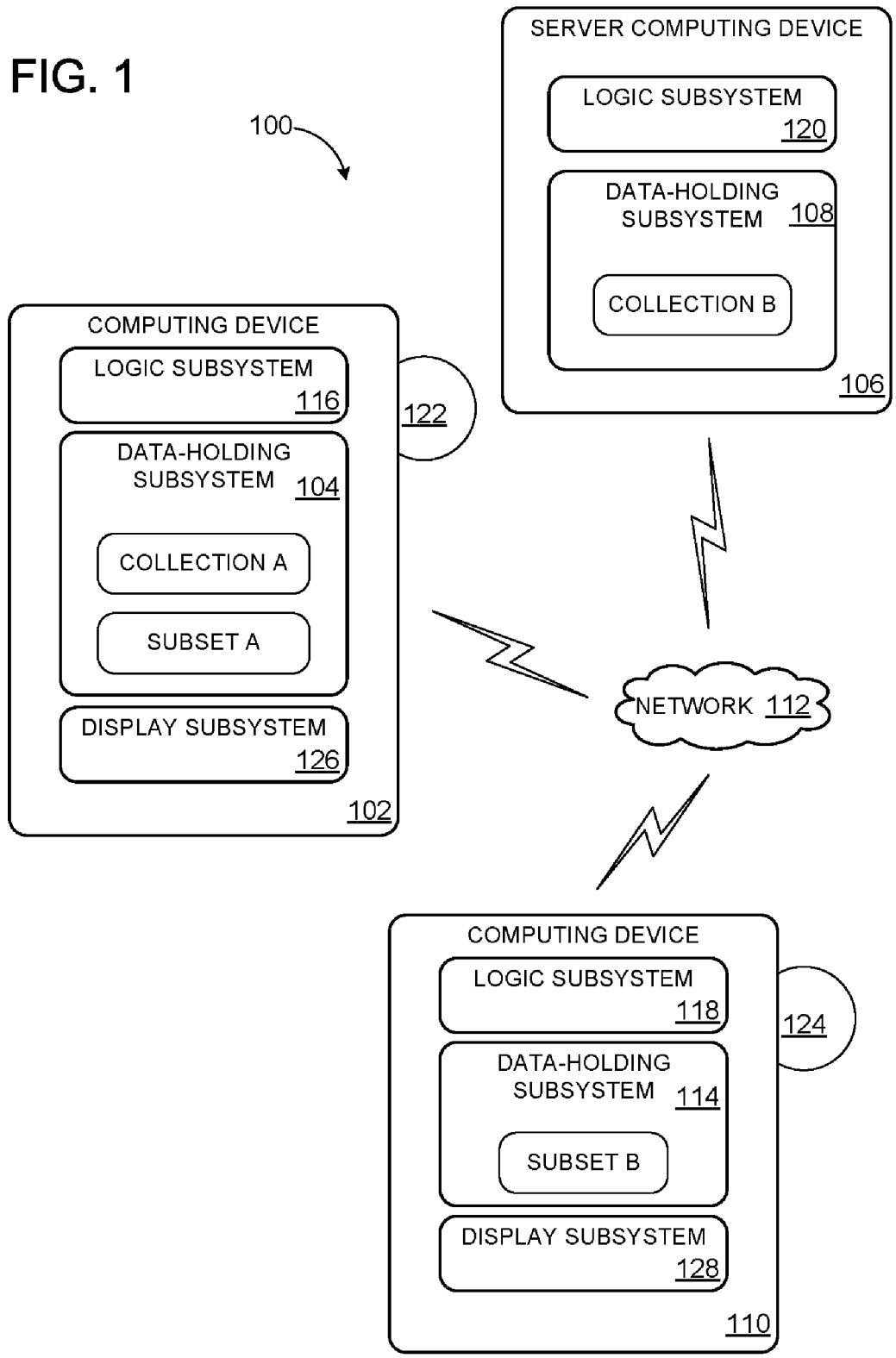
FIG. 1 shows a block diagram of an example embodiment of a use environment for filtering a collection of items in accordance with an embodiment of the present disclosure.

FIG. 1 shows an embodiment of an example use environment 100 for filtering a collection of items in accordance with the present disclosure. Such items may be any suitable type of item comprising associated metadata. As an example, a collection of items may be a collection of webpages wherein each webpage has metadata corresponding to properties of the page such as a title, subject, content, etc. As another example, a collection of items may be a collection of electronic issues of a magazine, wherein each issue has metadata associated with the issue such as a date, a topic, etc. As yet another example, a collection of items may be a collection of dog breed information, wherein each item corresponds to a particular dog breed and thus has metadata associated with the item such as a breed name, physical traits, behavioral traits, average size, average weight, etc. It can be appreciated that these examples are presented for the purpose of example, and are not intended to be limiting in any manner.

Continuing with FIG. 1, a collection of items may be stored locally on a computing device or may be stored remotely on a server computing device. For example, computing device 102 includes a collection of electronically stored items, namely collection A, stored locally within a data-holding subsystem 104 of computing device 102. Computing device 102 may be configured to filter collection A to create a subset of collection A, depicted as subset A, as described in more detail hereafter. Likewise, server computing device 106 includes a collection, namely collection B, stored on a data-holding subsystem 108 of server 106. Collection B may be accessed by another computing device, such as computing device 102 and/or computing device 110, via a network such as network 112. As depicted, computing device 110 filters collection B to create a subset of collection B, depicted as subset B. It will be understood that collections also may be stored in peer-to-peer networks, such that computing device 110 may search and filter collection A on computing device 102. Further, as yet another example, a collection may be generated dynamically from a script. For example, a script may generate a collection from search results of an online retailer (e.g., a collection of DVDs for sale by that online retailer). Further, such a script may be client-based or server-based. It will further be understood that these embodiments are described for the purpose of example, and are not intended to be limiting in any manner.

Computing devices 102 and 110 each comprise a logic subsystem, shown at 116 and 118, respectively, configured to execute instructions stored in data-holding subsystems 104 and 114, respectively, to perform embodiments related to filtering and display of collections of items as described herein. Server computing device 106 also includes a logic subsystem 120 configured to execute instructions stored in data-holding subsystem 108 to search collection B and provide search results to a requesting client computing device. Computing device 102, computing device 110 and server computing device 106 may optionally include other components not shown in FIG. 1.

A logic subsystem (e.g., logic subsystem 116, logic subsystem 118, logic subsystem 120) may include one or more physical devices configured to execute one or more instructions. For example, a logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

A data-holding subsystem (e.g., data-holding subsystem 104, data-holding subsystem 114, data-holding subsystem 108) may include one or more physical devices, which may be non-transitory, and which are configured to hold data and/or instructions executable by the logic subsystem to implement the herein described methods and processes. When such methods and processes are implemented, the state of the data-holding subsystem may be transformed (e.g., to hold different data). The data-holding subsystem may include a removable computer-readable medium or media and/or built-in computer-readable medium or media. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, a logic subsystem and data-holding subsystem of a same computing device may be integrated into one or more common devices, such as an application specific integrated circuit or a system on a chip.

FIG. 1 also illustrates computer-readable removable media 122 and 124 which may be used to store and/or transfer data and/or instructions executable by computing devices 102 and 110, respectively, to implement the herein described methods and processes.

Computing device 102 and computing device 110 also each includes a display subsystem, shown at 126 and 128, respectively. With regard to computing device 102, display subsystem 126 may be used to present a visual representation of data held by data-holding subsystem 104. Likewise, with regard to computing device 110, display subsystem 128 may be used to present a visual representation of data held by data-holding subsystem 114. As the herein described methods and processes change the data held by the data-holding subsystem, and thus transform the state of the data-holding subsystem, the state of display subsystem may likewise be transformed to visually represent changes in the underlying data. The display subsystem may include one or more display devices utilizing virtually any type of technology. Such a display device may be combined with a logic subsystem and/or a data-holding subsystem in a shared enclosure, or such display devices may be peripheral display devices. A display subsystem may be configured to display user interface objects, such as embodiments of user interface objects comprising interactive filter views, as described in more detail below. Further, a display subsystem may also be configured to display items in a results portion of the display, embodiments of which are also described in more detail below.

Figure 2:
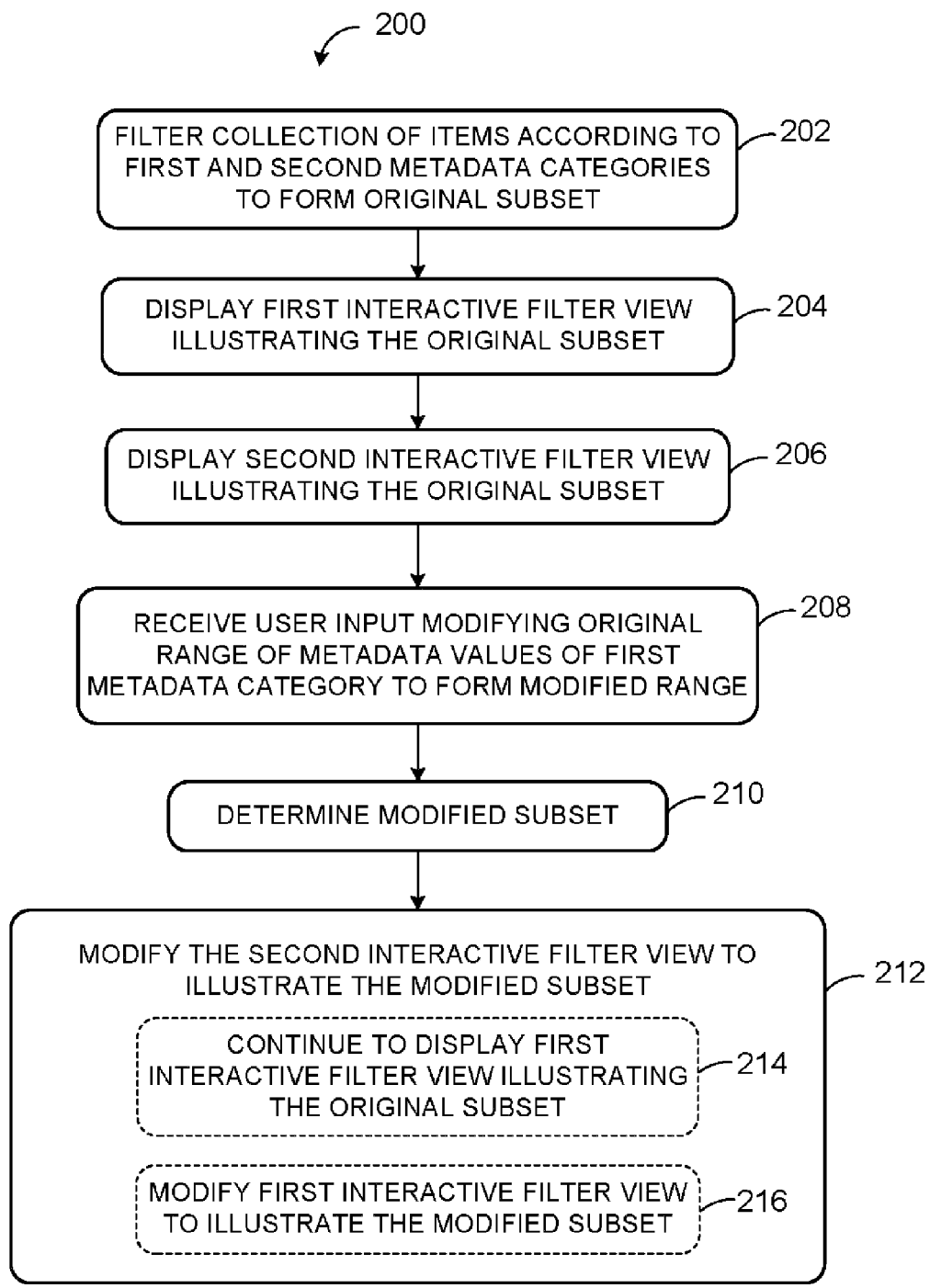
FIG. 2 shows a flow diagram of an embodiment of a method of filtering a collection of items.

Turning now to FIG. 2, FIG. 2 illustrates an example method 200 of filtering a collection of items. As introduced above, a collection may be a grouping of nearly any type of items having metadata including values for one or more of a plurality of metadata categories. Nonlimiting examples of collections include but are not limited to collections of cars, dog breeds, political figures, professional athletes, desktop files, search results, etc. Further, items of a collection may have metadata values for an unlimited number of metadata categories. As an example, in a collection of cars, each item may have metadata values for categories such as make, model, type, color, year, price point, safety rating, engine type, fuel type, etc. Moreover, metadata values may be of virtually any data type including but not limited to string data, date-based data, numeric data, etc. It should be appreciated that collections may also be heterogeneous. For example, a collection may include heterogeneous items such as cars and dog breeds. As an example, such a collection may then be filtered to a subset of items that are of a color "black."

When exploring such large datasets, it may be difficult to determine relationships between items. Thus, the faceted, metadata-driven exploration provided by filtering a collection of items via method 200 facilitates exploring large datasets, as described in more detail as follows.

At 202, method 200 includes filtering the collection of items according to a first metadata category and a second metadata category. This forms an original subset of items that comprise metadata values of the first metadata category and metadata values of the second metadata category. It will be understood that the term "original" as used is utilized in a temporal sense to describe any subset existing prior to a modification which modifies the subset, whether or not the subset is the result of a first filtering action in a use session. As an example of an original subset, a collection of cars may be filtered according to a "type" category and a "year" category such that the original subset comprises all cars of the collection having "type" and "year" metadata values (e.g., type=sedan and year=2000, type=truck and year=1998, etc.). As another example, a collection of dogs may be filtered according to a "breed" category and a "size" category such that the original subset comprises all dogs in the collection that have "breed" and "size" metadata values (e.g., breed=Great Dane and size=large, breed=Chihuahua and size=small, etc.).

At 204, method 200 includes displaying a first interactive filter view illustrating the original subset arranged according to metadata values of the first metadata category. The first interactive filter view may be any suitable user interface object configured to visually present such information, examples of which include, but are not limited to, a graph object and a list object.

As an example, in some embodiments, the first interactive filter view may comprise a graph object illustrating a frequency distribution of the original subset over an original range of metadata values of the first metadata category. In the case of the aforementioned car collection example, this may include a histogram of the original subset of cars wherein each bar of the histogram corresponds to a "type" metadata value associated with item(s) of the original subset (e.g., sedan, truck, SUV, sports car, etc.). Further, the height of each bar of the histogram may represent a number of cars in the subset having that "type" metadata value.

As another example, the first interactive filter view may comprise a list object visually presenting a list of the metadata values of the first metadata category of the original subset. In the case of the aforementioned dog collection example, the first interactive filter view may include a list of "breed" metadata values associated with item(s) of the subset (e.g., Chihuahua, Great Dane, Labrador, Terrier, etc.). Further, such a list object may display any sort of additional information, such as a count of the number of items in the collection associated with that particular metadata value.

At 206, method 200 includes displaying a second interactive filter view illustrating the original subset arranged according to metadata values of the second metadata category. Likewise, the second interactive filter view may be any suitable user interface object configured to visually present such information, such as a list object, a graph object, etc. For example, in the case of the aforementioned car collection example, the second interactive filter view may be a list object visually presenting "year" metadata values associated with item(s) of the subset (e.g., 1970, 1998, 1999, 2000, etc.) Such a list object may further display any sort of additional information, such as a count of the number of items in the subset associated with that particular metadata value. As another example, for the case of the aforementioned dog collection example, the second interactive filter view may be a graph object visually presenting a histogram of the original subset of dogs, wherein each bar of the histogram corresponds to a "size" metadata value associated with item(s) of the subset (e.g., small, medium, large, etc.). Further, the height of each bar may represent a number of dogs in the original subset having that "size" metadata value.

As such, the first and second interactive filter views are inter-related in that they both illustrate items of the original subset, yet each filter view illustrates the subset arranged over metadata values associated with a category respective to the filter. The original subset can then be further filtered via user input(s) to the interactive filter view(s), described in more detail as follows.

At 208, method 200 includes receiving user input via the first interactive filter view modifying an original range of metadata values of the first metadata category to form a modified range of metadata values of the first metadata category. The user input may comprise any suitable type of user input such as input via an input device (e.g., mouse, keyboard, etc.), touch input (e.g., finger touch, touch gesture, etc.), etc. In some embodiments, the user input may indicate a selection on a user interface object (e.g., checkbox, slider object, graph object, drop-down menu, radio-button, etc.) indicating how to modify the original range to form the modified range. The user input may indicate specific metadata values of the first metadata category to be included or excluded when forming the modified range. As such, it should be appreciated that the original range may be modified via exclusion, wherein a user selects metadata values that they do not want included in the modified range.

As a more specific example embodiment, in the case of a graph object, the original range may be visually indicated by an adjustable slider object (e.g., a range indicating object) which may be moved on the user interface by a user input to modify the range of metadata values. As another example embodiment, for the case of a frequency distribution, the frequency bars in the frequency distribution may be user interface objects. Thus, an original range may be modified by selecting one or more frequency bars corresponding to a particular range of metadata values to modify the original range. As yet another example, in the case of a list object, specific metadata values may be selected (e.g., via checkboxes) to modify the range of metadata values to include the selected values and to exclude the un-selected values.

At 210, method 200 includes determining a modified subset of items that comprise metadata values of the first metadata category falling within the modified range and that also comprise metadata values of the second metadata category. In other words, determining the modified subset may include further filtering the subset based on the modified range, such that items of the original subset having metadata values of the first category falling within the modified range are included in the modified subset and items of the original subset having metadata values of the first category falling outside of the modified range are excluded from the modified subset.

At 212, method 200 includes modifying the second interactive filter view to illustrate the modified subset arranged according to metadata values of the second metadata category. In other words, the second interactive filter view may be configured to update, so as to now illustrate the modified subset instead of the original subset. Just as the modified subset has a modified range of metadata values associated with the first category, a range of metadata values of the second metadata category (e.g., range of second metadata values) may be modified as well. Thus, in some embodiments, modifying the second interactive filter view may include modifying a range of second metadata values displayed based upon metadata values of the second metadata category in the modified subset.

As an example, for the case of the second interactive filter view being a graph object illustrating a frequency distribution of the original subset over the original range, 212 of method 200 may include updating the graph object to illustrate a frequency distribution of the modified subset over the modified range of second metadata values. As another example, for the case of the second interactive filter view being a list object, 212 of method 200 may include displaying a list of metadata values within the modified range of second metadata values.

In other embodiments, modifying the second interactive filter view may comprise visually deemphasizing display of metadata values of the second metadata category not associated with the modified subset relative to metadata values of the second metadata category associated with the modified subset. For example, in the case of the second interactive filter view being a list object, metadata values now excluded from the modified range of second metadata values may be visually deemphasized on the display (e.g., changed to a grayscale format, changed to a strikethrough format, moved to a bottom of list, changed to a smaller font, removed from the list entirely, etc.) relative to values included in the modified range.

It should be appreciated that visually deemphasized metadata values may be subsequently visually emphasized if additional items are added or appended to the original collection of items. Such updating may be particularly useful when items are displayed in a "paginated" style, similar to search results. As an example, a collection may include the 100 newest players to join the NBA. The collection may be filtered to display a subset of players on the Lakers team and on the Knicks team. The subset may be further filtered to display players earning more than $500,000. As a result, the Knicks option may be visually deemphasized if none of the Knicks players in the subset earns more than $500,000. The next 100 newest players (e.g., 101 to 200) to join the NBA may then be added/appended to the collection (e.g., via an on-screen affordance, an automatic selection, etc.). As such, the Knicks option may reappear now that there is a Knicks player earning more than $500,000.

In some embodiments, the user interface may further include a results portion configured to visually present a representation of the items of a subset. The results portion may be configured to update display of the subset as the subset is modified. In such a case, upon forming the original subset, the original subset of items may be displayed in a results portion of a display, and upon determining the modified subset, the results portion may be updated to display the modified subset of items. Examples of the results portion are described in more detail, by way of example, with reference to FIGS. 3-5.

In this way, method 200 provides a visualization of a dataset, which evolves with the dataset as it is further modified via filtering. In particular, method 200 provides a powerful interplay between data and metadata, as well as interplay between metadata categories. Thus, relationships between metadata categories of the set can be exposed. This may facilitate content discovery for a user, in that a user can discover relationships between the metadata values of the first and second categories which may otherwise not be apparent to the user. This may also enhance content exploration as the results of applying each filter can be previewed in the filter control before the filter is applied. This is further described by way of example, with respect to FIGS. 3-5.

Continuing with FIG. 2, in some embodiments, method 200 may further include, at 214, continuing to display the first interactive filter view illustrating the original range of first metadata values. Thus, the second interactive filter view may be modified to illustrate the modified subset while the first interactive filter continues to illustrate the original subset. In other words, whenever an interactive filter view is modified to further filter a subset of items, all other interactive filter views may update to illustrate the modified subset. In this way, the user interface object the user is interacting with may remain consistent. For example, if the first interactive filter view is a list of metadata values, by modifying all other lists besides that particular list, a user may stay focused on the original list. This may allow a user to experiment with data filtering via trial and error, without options being taken away during the interaction.

In this way, a user may interact with the user interface more intuitively, so as to discover information and interesting patterns in the dataset. Moreover, updating the other interactive filter views may encourage further exploration into the dataset, since the likelihood of applying filters in such a way that an empty set is produced is reduced. Thus, a user is less likely to get "lost" in the data, and consequently, disjointed user experiences may be avoided.

As an example, for the case of the first interactive filter view comprising a graph object, the graph object may originally illustrate a frequency distribution of the original subset over the original range of metadata values of the first metadata category. Then, upon determining the modified subset, the graph object may continue to illustrate the frequency distribution of the original subset over the original range (as opposed to updating the range and/or bars in the frequency distribution to illustrate a distribution for the modified subset).

In other embodiments, method 200 may include, at 216, upon determining the modified subset, displaying the first interactive filter view illustrating the modified subset arranged according to selected metadata values of the first metadata category falling only within the modified range. In other words, in such an embodiment, whenever an interactive filter view is modified to further filter a subset of items, all interactive filter views including the interactive filter view receiving the modification update to illustrate the modified subset. Thus, where the relationship between the categories is a logical "AND" relationship, applying any filter (e.g., via input modifying the range of the associated metadata values) may cause the subset to change. After re-calculating the subset the actual filters may be modified as well, providing a sort of a "feedback loop" back to the user. Such a loop can represent a logic sequence as follows: "look at the full set; apply a filter; see the new set AND the new metadata for it; observe the new set of metadata that is relevant for that set; apply another filter, etc."

Further, the user interface may present the user with an option whether to include 214 or 216 (i.e. whether to display original range in first interactive filter view, or whether to display the modified range). Thus, a user may choose whether to update all interactive filter views or just those other than the one currently receiving the user focus, depending on that particular search experience.

It will be understood that additional user input(s) may be received via the first interactive filter view, further modifying the modified subset. Further, it will be understood that the second interactive filter view may also be configured to receive user inputs. Upon receiving such a user input via the second interactive filter view, a range of the metadata values of the second category may be modified, thereby forming a further modified subset. As an example use scenario, a user input may be received via the second interactive filter view modifying a range of metadata values of the second metadata category displayed in the second interactive filter view, so as to form a modified range of second metadata values. In response, a further modified subset may be determined which comprises items having metadata values of the first metadata category that fall within the modified range of first metadata values and also having metadata values of the second metadata category that fall within the modified range of second metadata values. The first interactive filter view may then be modified to illustrate the further modified subset arranged according to metadata values of the first metadata category. It will be understood that the second interactive filter view may or may not be updated to illustrate a range of values of the further modified subset.

Further, it can be appreciated that although only two interactive filter views and two metadata categories are described above, such a method of filtering may utilize any suitable number of interactive filter views and filter categories without departing from the scope of this disclosure. As a possible use scenario, the modified subset described above may be filtered according to a third metadata category to form a further modified subset of items. As such, each item of the further modified subset has metadata values of the first metadata category, metadata values of the second metadata category and metadata values of the third metadata category. In such a case, where the user interacts with the third interactive filter view to form a further modified subset, the first interactive filter view may be modified to illustrate the further modified subset arranged according to metadata values of the first metadata category and the second interactive filter view to illustrate the further modified subset arranged according to metadata values of the second metadata category. However, the third interactive filter view may illustrate the modified subset arranged according to metadata values of the third metadata category. As such, all interactive filter views other than the third interactive filter view receiving the input may be updated to illustrate the further modified subset. It can be appreciated that this embodiment is described for the purpose of example and is not intended to be limiting in any manner. For example, in other embodiments, all interactive filter views including the third interactive filter view may update to illustrate the further modified subset.

Figure 3:
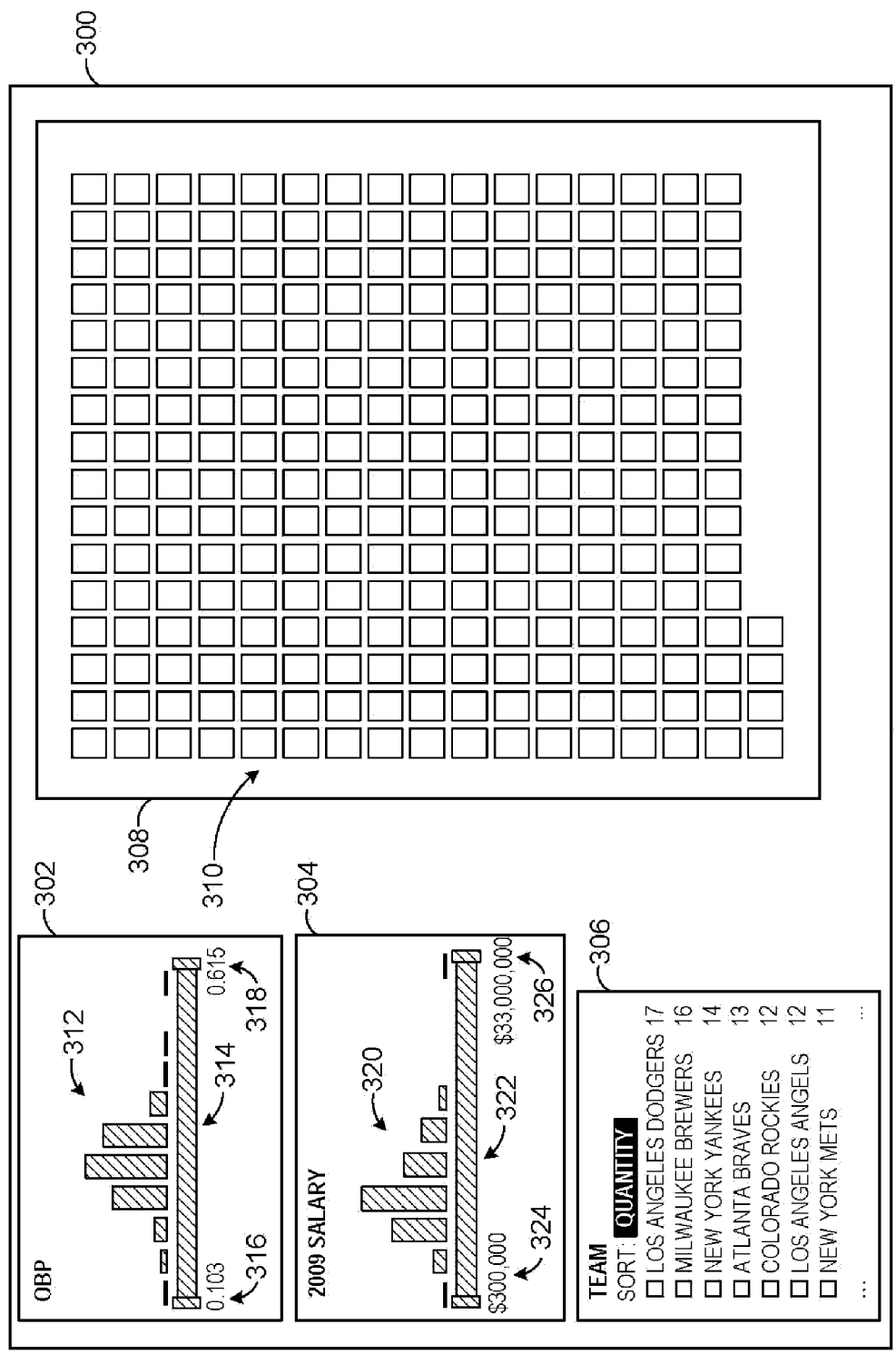
FIGS. 3-5 show schematic depictions of various example embodiments of user interfaces comprising interactive filter views, and also illustrate examples of user interactions therewith.

Turning now to FIG. 3, FIG. 3 shows a user interface 300. Such a user interface may be visually presented, for example, via a display subsystem of a computing device such as display subsystem 126 of computing device 102 or display subsystem 128 of computing device 110. User interface 300 comprises several user interface objects providing interactive filter views, namely first interactive filter view 302, second interactive filter view 304 and third interactive filter view 306.

The interactive filter views may be any suitable user interface object, such as a graph object or a list object. In the example depicted in FIG. 3, first interactive filter view 302 and second interactive filter view 304 comprise graph objects whereas third interactive filter view 306 comprises a list object. However, it can be appreciated that this is just one of many possible configurations. User interface 300 may further comprise a results portion 308 of the display configured to display items of the subset. As the subset is modified, the results portion may be configured to update, so as to display the newly modified subset, as described in more detail by way of example hereafter.

Continuing with FIG. 3, an example of filtering a collection of items comprising information regarding professional baseball players is illustrated. Each player item has metadata including metadata values for various metadata categories such as a name, a team, an on-base percentage (OBP), a batting average, a salary, etc. Traditionally, it may not only be difficult to view a visualization of a dataset of several thousand baseball players, but further, it may be difficult to discover the relationship between various categories (e.g., relationship between compensation and performance). However, exposing metadata relationships through filter interplay as disclosed herein provides such filtering and exposure of relationships.

The original subset 310 illustrated in FIG. 3 is filtered according to three metadata categories, namely "OBP," "salary for the year 2009," and "team," such that each item (e.g., player) of the original subset has metadata values for each of these categories. For example, a player may have the values OBP=0.4, 2009 Salary=$450,000, and team=Colorado Rockies. The results portion 308 is configured to display the original subset 310 of players.

First interactive filter view 302 illustrates the original subset 310 according to a first category of "OBP." In this example, first interactive filter view 302 comprises a graph object illustrating a frequency distribution 312 (e.g., histogram) for a range 314 of all OBP metadata values of players of the original subset 310. As depicted, a lower endpoint 316 of range 314 is 0.103 whereas an upper endpoint 318 of range 314 is 0.615. The frequency distribution 312 indicates the frequency of OBP values within the original subset 310. As such, one may see that more players within original subset 310 have OBPs in a middle of range 314 whereas fewer players within original subset 310 have OBPs in a lower or upper extremity of range 314.

Second interactive filter view 304 illustrates original subset 310 according to a second category of "2009 Salary." In this example, second interactive filter view 304 is also a graph object illustrating a frequency distribution. However, the frequency distribution 320 of second interactive filter view 304 is for a range 322 of all 2009 salaries of players of original subset 310. As depicted, a lower endpoint 324 of range 322 is $300,000 whereas an upper endpoint 326 of range 322 is $33,000,000. As such, frequency distribution 320 indicates the frequency of 2009 salaries within original subset 310. Thus, one may see that more players within original subset 310 have salaries in a middle of range 322 whereas fewer players within original subset 310 have salaries in a lower or upper extremity of range 322.

Third interactive filter view 306 illustrates original subset 310 according to a third category of "team." In this example, third interactive filter view 306 is a list object illustrating team names of each player within original subset 310. Third interactive filter view 306 further illustrates a number of players of original subset 310 associated with each team name. Thus, one may see, for example, that original subset 310 comprises 17 Dodgers players, but only 12 Rockies players.

Figure 4:
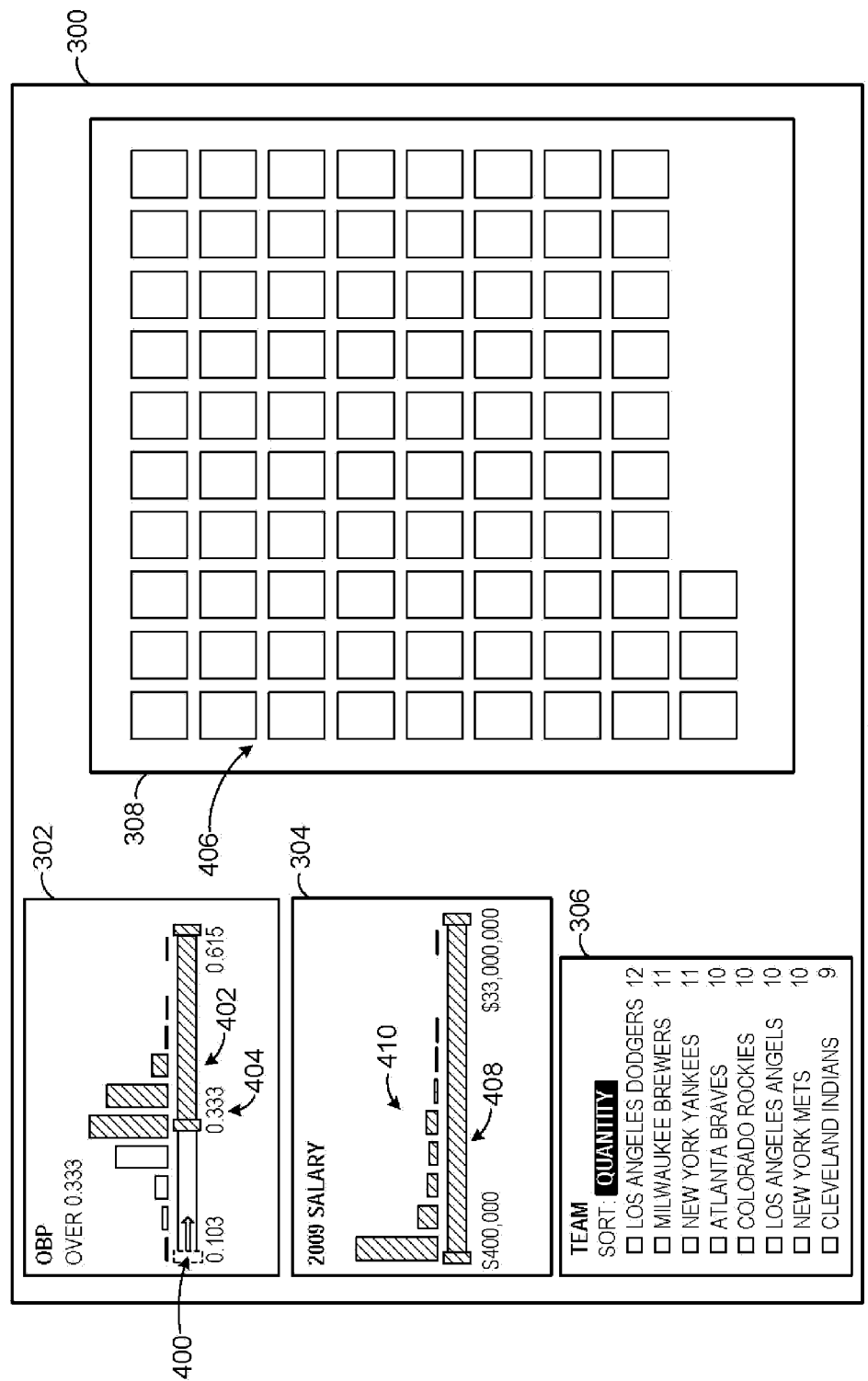

Turning now to FIG. 4, at 400, FIG. 4 illustrates a range of first interactive filter view 302 being modified based on a received user input. As an example, the user input may be a selection of a category "OBP>0.333" from a menu, to filter the set down to the top performers. As another option, the user input may be a selection of a range indicating object adjusting the endpoint of the range. The modified range 402 then has a lower endpoint 404 of 0.333.

Upon determining modified range 402, a modified subset 406 of players may be determined by further filtering original subset 310 based on modified range 402. In this case, players of original subset 310 having OBP values greater than 0.333 are selected to be included within modified subset 406, whereas players of original subset 310 having OBP values less than 0.333 are excluded from modified subset 406.

Accordingly, results portion 308 may update to display the modified subset 406 of players. The results portion 308 may update display of the players in any suitable manner. For example, in some embodiments, an animation may be displayed which removes excluded players from the display, such that only selected players remain. As such, the results portion is then displaying the modified subset 406.

Further, in response to determining modified subset 406, first interactive filter view 302 continues to display the original subset 310. However, in the depicted example, first interactive filter view 302 updates to visually indicate which OBP values are associated the modified subset 406. It can be appreciated that this is just one possible example, and in other examples, first interactive filter view 302 may instead update to display the modified subset 406, in which case the entire distribution would be recalculated, such that the frequency distribution over only the modified range 402 may be displayed.

Second interactive filter view 304 illustrates such a latter case, namely of second interactive filter view 304 updating to illustrate the modified subset 406. As such, a modified range 408 of salaries associated with the modified subset 406 is determined As depicted, the modified range 408 has a lower endpoint of $400,000 and an upper endpoint of $33,000,000. A new frequency distribution 410 is displayed for this modified range 408, which illustrates that modified subset 406 has more players with a salary near the lower endpoint of modified range 408 than near the middle of or the upper endpoint of modified range 408.

Further, third interactive filter view 306 also updates to illustrate the modified subset 406. As such, only team names associated with the items of modified subset 406 are illustrated. Accordingly, the players-per-team count associated with each team has updated based on modified subset 406.

Figure 5:
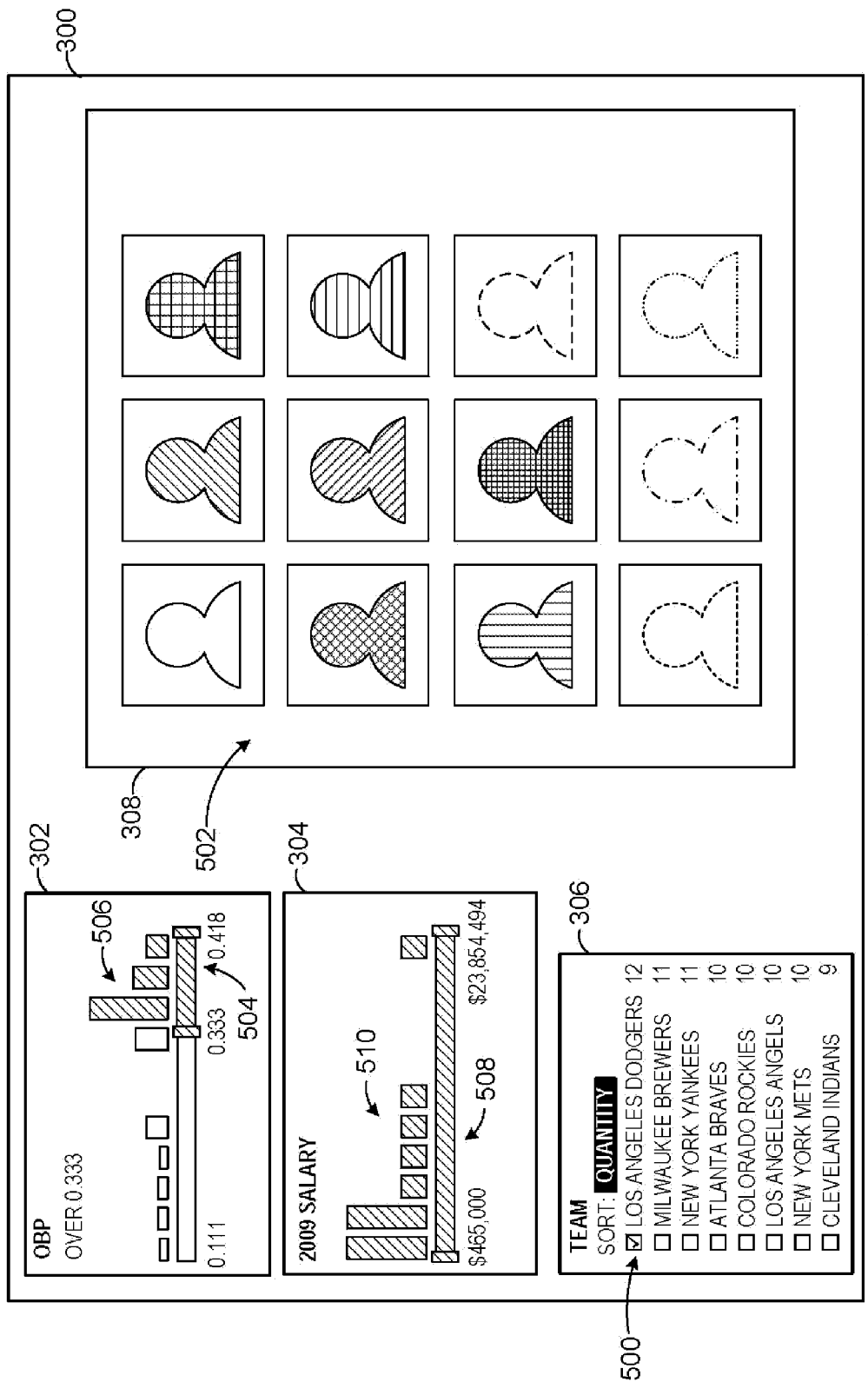

Turning now to FIG. 5, at 500, FIG. 5 illustrates a team name of Los Angeles Dodgers being selected which further modifies a range of team names. As an example, a user input may be received indicating a selection of a checkbox associated with Los Angeles Dodgers. In response, a range of team names is modified to include Los Angeles Dodgers and to exclude all other teams.

Upon determining the modified range of team names, a further modified subset 502 of items may be determined by further filtering modified subset 406 based on the modified range of team names. In this case, players of modified subset 406 having a team name of Los Angeles Dodgers are included within the further modified subset 502, and players of modified subset 406 having all other team names are excluded from modified subset 502. In other words, players of further modified subset 502 are players within the collection which have an OBP>0.333 AND a team=Los Angeles Dodgers. Accordingly, results portion 308 may update to display the further modified subset 502 of players.

Additionally, in response to determining the further modified subset 502, third interactive filter view 306 continues to display team names for the modified subset 406, and also updates to visually indicate which team name is associated with further modified subset 502 (e.g., by displaying a check selecting the checkbox associated with Los Angeles Dodgers). It can be appreciated that this is just one possible example, and in other examples, third interactive filter view 306 may update, for example, to display the further modified subset 502 by visually deemphasizing team names which are not selected. For example, all teams other than the Dodgers may be formatted in grayscale, formatted in strikethrough, removed entirely from display, etc.

First interactive filter view 302 updates to illustrate further modified subset 502. As such, a further modified range 504 of salaries associated with the further modified subset 502 of players is determined As depicted, the further modified range 504 has a lower endpoint of 0.111 and an upper endpoint of 0.418. A new frequency distribution 506 is displayed for the further modified range 504, which illustrates that the Los Angeles Dodgers has more players with a salary near the upper endpoint than near the middle or the lower endpoint of further modified range 504. However, it can be appreciated that third interactive filter view 306 may continue to apply the selection of "OBP>0.333" such that the lower endpoint of further modified range 504 may be visually indicated as 0.333 instead of 0.111.

Second interactive filter view 304 also updates to illustrate the further modified subset 502. As such, a further modified range 508 of salaries associated with the further modified subset 502 of players is determined As depicted, the further modified range 508 has a lower endpoint of $465,000 and an upper endpoint of $23,854,494. A new frequency distribution 510 is displayed for this further modified range 508, which illustrates that further modified subset 502 has more players with a salary near the lower endpoint than near the upper endpoint of further modified range 508.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of filtering a collection of items, each item having metadata including values for one or more of a plurality of metadata categories, the method comprising:

filtering via the computing device the collection of items according to a first metadata category and a second metadata category to form an original subset of items that comprises metadata values of the first metadata category and metadata values of the second metadata category;

displaying via the computing device a first interactive filter view illustrating the original subset of items arranged according to a displayed range of metadata values of the first metadata category;

displaying via the computing device a first interactive control associated with the first interactive filter view, the first interactive control being manipulable to vary the displayed range of metadata values of the first metadata category;

displaying via the computing device, while displaying the first interactive filter view, a second interactive filter view illustrating the original subset of items arranged according to a displayed range of metadata values of the second metadata category, the second interactive filter view being inter-related with the first interactive filter view;

receiving via the computing device user input via the first interactive filter view modifying an original range of metadata values of the first metadata category to form a modified range of metadata values of the first metadata category;

determining via the computing device a modified subset of items that comprises metadata values of the first metadata category falling within the modified range of metadata values of the first metadata category, the modified subset of items also comprising metadata values of the second metadata category; and modifying via the computing device the second interactive filter view to illustrate the modified subset of items arranged according to metadata values of the second metadata category while continuing to display the first interactive filter view illustrating the original subset of items according to the original range of metadata values of the first metadata category, the first interactive filter view further illustrating the modified range of metadata values of the first metadata category associated with the modified subset of items.

2. The method of claim 1, further comprising, upon determining the modified subset of items, continuing to display the first interactive filter view illustrating the original range of metadata values of the first metadata category.

3. The method of claim 1, further comprising, upon determining the modified subset of items, displaying the first interactive filter view illustrating the modified subset of items arranged according to selected metadata values of the first metadata category falling only within the modified range of metadata values of the first metadata category.

4. The method of claim 1, wherein one or more of the first interactive filter view and the second interactive filter view comprises one or more of a graph object and a list object.

5. The method of claim 1, wherein the first interactive filter view comprises a graph object illustrating a frequency distribution of the original subset of items over the original range of metadata values of the first metadata category.

6. The method of claim 5, further comprising, upon determining the modified subset of items, continuing to display the graph object illustrating the frequency distribution of the original subset of items over the original range.

7. The method of claim 5, further comprising, upon determining the modified subset of items, displaying the graph object illustrating a frequency distribution of the modified subset of items only over the modified range.

8. The method of claim 1, wherein modifying the second interactive filter view comprises visually deemphasizing display of metadata values of the second metadata category not associated with the modified subset of items relative to metadata values of the second metadata category associated with the modified subset of items.

9. The method of claim 1, further comprising:
receiving user input via the second interactive filter view modifying a range of metadata values of the second metadata category displayed in the second interactive filter view to form a modified range of second metadata values;
in response, determining a further modified subset of items comprising items having metadata values of the first metadata category that fall within the modified range of metadata values of the first metadata category and also having metadata values of the second metadata category that fall within the modified range of second metadata values; and
modifying the first interactive filter view to illustrate the further modified subset of items arranged according to metadata values of the first metadata category.

10. The method of claim 1, further comprising:
filtering the collection of items according to the first metadata category, the second metadata category, and a third metadata category to form a further modified subset of items that comprises metadata values of the first metadata category, metadata values of the second metadata category, and metadata values of the third metadata category;
displaying a third interactive filter view illustrating the further modified subset of items arranged according to metadata values of the third metadata category;
modifying the first interactive filter view to illustrate the further modified subset of items arranged according to metadata values of the first metadata category; and
modifying the second interactive filter view to illustrate the further modified subset of items arranged according to metadata values of the second metadata category.

11. The method of claim 1, further comprising displaying the original subset of items in a results portion of a display, and upon determining the modified subset of items, updating the results portion to display the modified subset of items.

12. The method of claim 1, wherein modifying the second interactive filter view comprises modifying a range of second metadata values displayed based upon metadata values of the second metadata category in the modified subset of items.

13. A computing device, comprising:
a display configured to display a user interface;
a logic subsystem configured to execute instructions and to access an electronically stored collection of items, each item having metadata for one or more of a plurality of metadata categories; and
a data-holding subsystem holding instructions executable by the logic subsystem to:
filter the collection of items according to a first metadata category and a second metadata category to form an original subset of items that comprises metadata values of the first metadata category and metadata values of the second metadata category;
display a first interactive filter view illustrating the original subset of items arranged according to a displayed range of metadata values of the first metadata category;
display a first interactive control associated with the first interactive filter view, the first interactive control manipulable to vary the displayed range of metadata values of the first metadata category;
display, while displaying the first interactive filter view, a second interactive filter view illustrating the original subset arranged according to a displayed range of metadata values of the second metadata category, the second interactive filter view being inter-related with the first interactive filter view;
receive user input via the first interactive filter view modifying an original range of metadata values of the first metadata category to form a modified range of metadata values of the first metadata category;
determine a modified subset of items that comprises metadata values of the first metadata category that fall within the modified range of metadata values of the first metadata category and that also comprises metadata values of the second metadata category; and
modify the second interactive filter view to illustrate the modified subset of items arranged according to metadata values of the second metadata category while continuing to display the first interactive filter view illustrating the original subset of items arranged according to the original range of metadata values of the first metadata category, the first interactive filter view further illustrating the modified range of metadata values of the first metadata category associated with the modified subset of items.

14. The computing device of claim 13, wherein the first interactive filter view comprises a list object visually presenting a list of the metadata values of the first metadata category, and wherein the instructions are executable to receive user input via the first interactive filter view by receiving selection of one or more metadata values of the first metadata category from the list.

15. The computing device of claim 14, wherein the second interactive filter view comprises a graph object illustrating a frequency distribution of the original subset of items arranged according to metadata values of the second metadata category.

16. The computing device of claim 14, wherein the second interactive filter view comprises a list object visually presenting a list of the metadata values of the second metadata category.

17. The computing device of claim 13, wherein the instructions are executable to modify the second interactive filter view by visually deemphasizing display of metadata values of the second metadata category not associated with the modified subset of items relative to metadata values of the second metadata category associated with the modified subset of items.

18. The computing device of claim 13, wherein the instructions are further executable to:
receive user input via the second interactive filter view modifying a range of metadata values of the second metadata category displayed in the second interactive filter view to form a modified range of second metadata values;
in response, determine a further modified subset of items comprising items having metadata values of the first metadata category that fall within the modified range of metadata values of the first metadata category and also having metadata values of the second metadata category that fall within the modified range of second metadata values; and
modify the first interactive filter view to illustrate the further modified subset of items arranged according to metadata values of the first metadata category.

19. A computer-readable medium comprising instructions executable by a computing device to filter a collection of items, each item having metadata including values for one or more of a plurality of metadata categories, the instructions being executable to:
filter the collection of items according to a first metadata category and a second metadata category to form an original subset of items that comprises metadata values of the first metadata category and metadata values of the second metadata category;
display a graph object illustrating a frequency distribution of the original subset of items arranged according to a displayed range of metadata values of the first metadata category;
display an interactive control associated with the graph object, the interactive control manipulable to vary the displayed range of metadata values of the first metadata category;
display, while displaying the graph object, a list object illustrating metadata values of the second metadata category, the list object being inter-related with the graph object;
receive user input via the graph object modifying an original range of metadata values of the first metadata category to form a modified range of metadata values of the first metadata category;
determine a modified subset of items that comprises metadata values of the first metadata category that fall within the modified range of metadata values of the first metadata category, the modified subset of items also comprising metadata values of the second metadata category; and
modify the list object to illustrate the metadata values of the second metadata category associated with the modified subset of items, the graph object further illustrating the modified range of metadata values of the first metadata category associated with the modified subset of items.

20. The computer-readable medium of claim 19, wherein the graph object illustrates a frequency distribution of the original subset of items over the original range of metadata values of the first metadata category, and wherein the instructions are executable to receive user input via one or more of adjustment to a range indicating object that visually indicates the original range of metadata values of the first metadata category and selection of one or more bars of the frequency distribution.

* * * * *